Sept. 18, 1923.
B. G. KLUGH
1,468,206
SEAL JOINT FOR SINTERING AND GAS TREATING APPARATUS
Filed Nov. 26, 1920
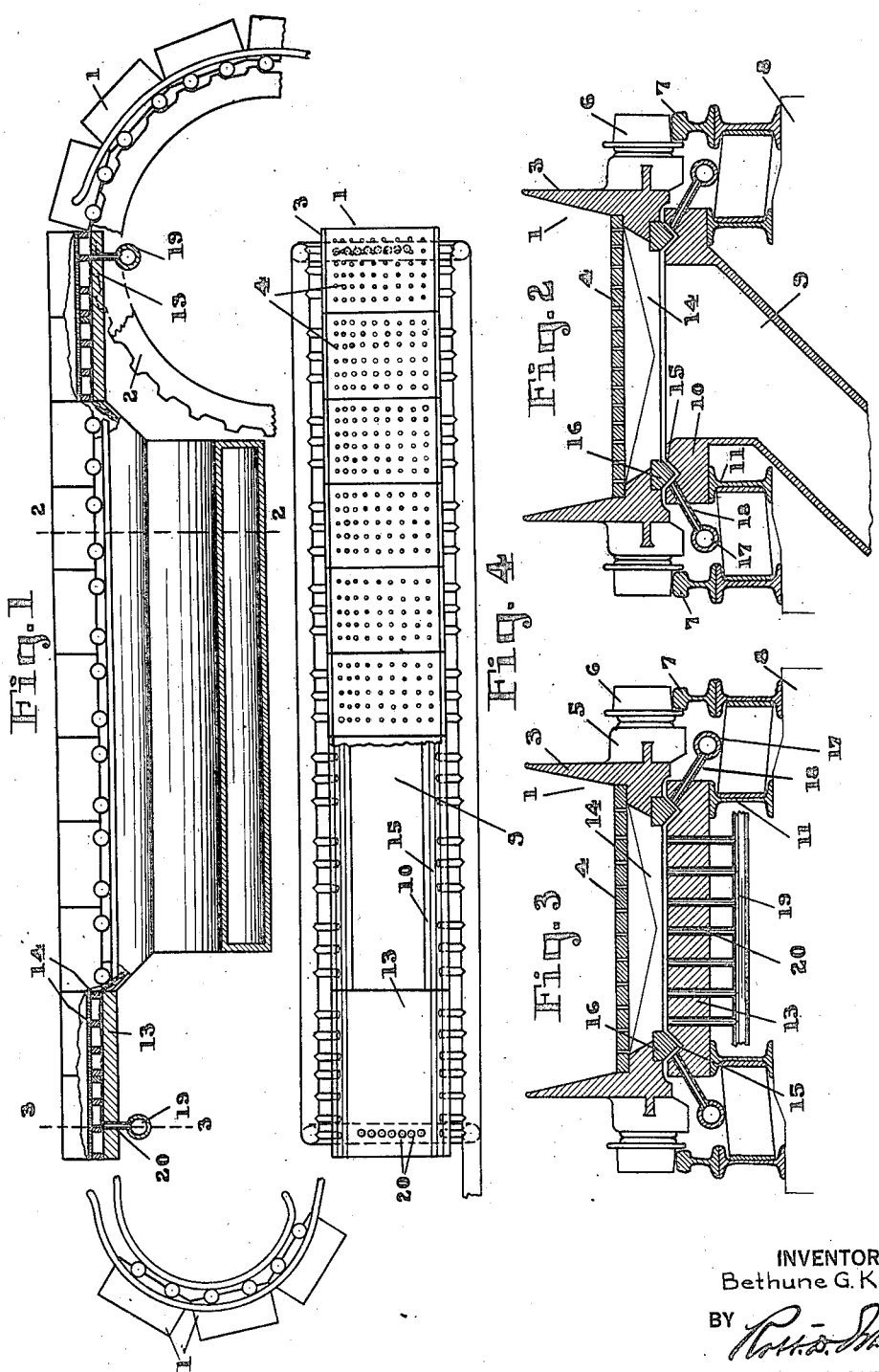
INVENTOR
Bethune G. Klugh.
BY
ATTORNEY Patented Sept. 18, 1923.

1,468,206

UNITED STATES PATENT OFFICE.

BETHUNE G. KLUGH, OF ANNISTON, ALABAMA.

SEAL JOINT FOR SINTERING AND GAS-TREATING APPARATUS.

Application filed November 26, 1920. Serial No. 426,597.

*To all whom it may concern:*

Be it known that I, BETHUNE G. KLUGH, a citizen of the United States of America, residing at Anniston, in the county of Calhoun and State of Alabama, have invented certain new and useful Improvements in Seal Joints for Sintering and Gas-Treating Apparatus, of which the following is a specification.

My invention relates to an improvement in means for sealing the joint between the suction or wind box and the movable pallets or stock conveying elements of a sintering, roasting or gas treating apparatus, and has for its object to accomplish this purpose by the provision of an elongated close clearance water sealed joint.

It is a further object of my invention to avoid the provision of any loose mechanical parts, such as sealing bars, or the use of any sealing joints relying upon a close metal-to-metal contact.

Heretofore in sealing the pallets of a continuous sintering machine in their passage over the suction or wind box various means have been employed to prevent the leakage of air past the traveling joint between the pallets and the box. Where the pallets are caused to slide with their full weight on the box to seal it by a close metal-to-metal joint. the results are excessive wear of both pallets and box, and a lack of uniformity in the wear of different pallets causing grooves to wear in same so that they will hang on the dead plates at the ends of the box and occasionally wreck the apparatus. Also it has been proposed to let the pallets continue to travel on their wheels or roller supports while floating or rigid metal contact members are provided to so closely engage co-related parts on the box that the leakage of air through the joint would be sufficiently restricted. In practice, however, none of these appliances have proven entirely satisfactory because the loosely fitting seal bars will warp or become loose and jam the mechanism, while the rigid contact members give too great friction or too great clearances and cannot take care of differences in size and expansion of the pallets.

According to my invention, the box and pallets are provided with co-related elements which form a continuous water sealed gland or joint, the clearance in which is sufficiently close and elongated to resist the flow of water therethrough so effectually that water can be relied upon to effectively seal the joint against suction or air pressure according to the type of apparatus used, and yet I avoid the probability of any rigid contacts or friction which would render the apparatus impractical. As a preferred means for forming this sealing joint at the sides I provide the box and pallets with members forming a V-shaped sealing joint into which water is supplied as needed.

My invention further comprises the novel details of the means for water sealing the clearance between the pallets and the dead plates at either end of the wind box to effectively seal at these points against the inflow of air. Obviously, my improved joint seal is applicable wherever a stock carrying element, whether tiltable, rotatable, or having a continuous, intermittent or reciprocable travel, is co-related with and movable relatively to a fixed box for suction or wind in a machine for treating by gas any stock, such as ore or the like, on said element.

My invention further comprises the novel details of construction and arrangements of parts, which in their preferred embodiment only are illustrated in the accompanying drawings which form a part of this specification, and in which:—

Fig. 1 is a partial side elevation of a continuous sintering machine broken away in cross section over the dead plates to illustrate the means for sealing at these points.

Fig. 2 is a transverse cross sectional view taken on the line 2—2 of Fig. 1.

Fig. 3 is a cross sectional view through the line 3—3 of Fig. 1; and

Fig. 4 is a plan view of the top of the suction box with the pallets omitted to the left, and showing grate bars in place to the right.

Similar reference numerals refer to similar parts throughout the drawings.

As illustrated, I show typically a continuous sintering machine of standard construction in so far as its pallets 1 and driving sprockets 2 is concerned. The several pallets are provided with abutting side flanges 3 and with grates 4 which receive and support the material to be sintered. The pallets are also provided with side bearing bosses 5 in which are journaled the axles for the supporting wheels 6. These wheels are adapted to travel upon the rails 7 which are suitably supported on the frame work 8 of the machine which supports the pallets in their travel over the suction box 9 or the sintering zone. This suction box is provided with integral outwardly overhanging side flanges 10 which are supported on eye beams 11 forming part of the general supporting structure 8. The suction box 9 is connected by a passage 12 with any suitable suction mechanism, not shown. At each end of the suction box are dead plates 13 and the several pallets are each provided with transverse bottom bars 14 so disposed as to travel with close clearance above these dead plates as the pallets pass over them.

The construction as thus described is all substantially standard and in reality forms no part of my present invention which is concerned chiefly with the provision of a practical and efficient means for sealing the joints, between the pallets on the one hand and the suction box and dead plates on the other, to prevent the undue admission of air to the suction box and thereby to increase the efficiency of the down draft through the sintering charge on the grates 4. As the simplest and most efficient means for sealing the clearance between the pallets and the sides of the suction box, I propose to provide the flanges 10 of the box on their top faces with a continuous longitudinal channel or groove 15 extending from end to end of the box and in parallelism with the tracks 7 and also continuing in line across the dead plates 13. This groove or channel is preferably of V-shape though this is not essential. To co-act with this channel or groove I provide the sintering pallets with sealing tongues or lips 16 which, if desired, may be formed as detachable and replaceable elements and which preferably are of V-shape type so as to enter and form with the walls of their respective groove 15 a restricted elongated and tortuous passage to which water is supplied by a manifold pipe 17 through branch pipes 18 which are closely associated throughout the length of the box and dead plates so as to supply water at short intervals for the entire length of the sealing joints on each side of the pallets. It will be observed that the pallets are supported by their wheels 6 with the sealing tongues 16 free to have the requisite lateral play in the grooves to prevent undue friction or binding, but regardless of the lateral displacement these tongues will engage one or the other sides of the grooves or will stand centrally therein in all operating positions, thus maintaining the requsite character of the sealing gland which my invention contemplates.

The means for sealing against the air leakage along the dead plates is illustrated more clearly in Fig. 3 and consists in passing a water manifold pipe 19 under each dead plate near its end most remote from the suction box and leading a series of closely associated branch pipes 20 from these manifolds 19 so as to introduce a sealing body of liquid across the outer ends of the dead plates. This body of liquid acts to seal the several joints provided between the bottom bars 14 and the dead plates, each of the bottom bars serving to proportionately reduce the suction pull against the entering sheet of water and thus giving the effect of an elongated close clearance. What surplus flows in over the dead plates or sides of the box is permitted to pass down into the suction box to cool the gases in accordance with the well established practice. Other types of close elongated water sealed joints may be provided within the scope of my invention and I do not wish to be considered as limiting same to the preferred type of tortuous gland shown.

It is obvious that my improved sealing arrangement will be equally advantageous if applied to intermittent sintering apparatus in which a removable tiltable or rotatable grate bar and stock carrying element is used in connection with a fixed wind box. In such cases the tortuous water seal gland is formed by a tongue on the removable element, co-related with a groove on the fixed box, and it would function in the same manner of that hereinbefore described for the moving pallets over a fixed suction box. My invention therefore may be said to cover sealing the joint between the grate or stock carrying element, and the fixed suction or wind box of any sintering apparatus, whether the pallets be moved continuously, intermittently, or interruptedly in relation to the suction box.

Moreover, it is immaterial whether the apparatus described be used for sintering, for roasting or other purposes involving the passage of gases through the interstices of loosely held stock on a porous bed carrying member, co-related with a fixed suction or wind box member, the action of my herein described liquid seal in tortuous gland disposition will be the same as that hereinbefore described. I therefore do not wish to be confined to the application of the hereindescribed invention, solely to the sintering of the materials carried on the movable element.

Having thus described my invention, what I claim as new and desire to secure by Letters Patent, is:—

1. In a continuous sintering machine comprising moving pallets and a suction box, co-acting elements on the pallets and suction box adapted to form a close transversely elongated joint, and means to supply liquid along said joint to seal it.

2. In a continuous sintering machine comprising moving pallets and a suction box, co-acting elements on the pallets and suction box adapted to form a tortuous gland, and means to supply liquid to seal said gland.

3. In a continuous sintering mechanism comprising a suction box, end dead plates and pallets movable over the box and dead plates, means for sealing the joint between the pallets and suction box comprising coacting elements on the pallets on the one hand and on the side walls of the suction box and dead plates on the other hand to form continuous transversely elongated close clearance joints extending from end to end of the suction box and pallets, and means to supply a sealing liquid throughout said joints.

4. A sealing means for a continuous sintering apparatus comprising a series of pallets having aligning sealing members at each side disposed parallel with their line of travel a suction box having marginal grooves adapted to receive with a loose running fit said sealing members on the pallets, means to introduce a sealing liquid to the joint surrounding said sealing members, and means to seal the joint between the pallets and the ends of the suction box.

5. In a continuous sintering machine, a suction box having dead plates at its ends, pallets having bottom transverse bars adapted to travel with close clearance above the plates, means to introduce a sealing liquid transversely across the outer ends of said plates to seal the joints between the plates and bars, and means to seal the joints between the box and sides of the pallets.

6. In a continuous sintering machine, a suction box, end dead plates, longitudinal V-shaped channels extending along the sides of the suction box and across the ends of the dead plates, water manifolds extending alongside said channels and across under the ends of the dead plates, branch pipes to deliver water from said manifold pipes to said channels and to the dead plates across their outer ends, a series of pallets having aligning V-shaped tongues adapted to travel with a free fit through said channels and to form therewith a tortuous sealing passage, and cross bottom bars on the pallets adapted to travel with a close clearance over the dead plates and to form a series of joints sealed by the water admitted across the ends of the dead plates.

7. In an apparatus for passage of gasses through a bed of material, comprising an element with porous stock supporting bottom and a suction box which are relatively movable, coacting elements on the box and stock support adapted to form a continuous joint therebetween, and means to supply liquid along said joint to seal same.

8. In a sintering apparatus comprising a movable pan with stock supporting grates and a suction box, co-acting element on the pan and suction box adapted to form a continuous gland, and means to supply liquid to seal said gland.

In testimony whereof I affix my signature.

BETHUNE G. KLUGH.

Witness:
NOMIE WELSH.